United States Patent [19]

Kock et al.

[11] Patent Number: 4,861,858
[45] Date of Patent: * Aug. 29, 1989

[54] WHOLLY AROMATIC THERMOTROPIC POLYESTERS

[75] Inventors: Hans-Jakob Kock, Ludwigshafen; Bernd Hisgen, Limburgerhof; Michael Portugall, Wachenheim; Erhard Seiler, Ludwigshafen; Gerd Blinne, Bobenheim, all of Fed. Rep. of Germany

[73] Assignee: BASF Aktiengesellschaft, Ludwigshafen, Fed. Rep. of Germany

[ * ] Notice: The portion of the term of this patent subsequent to Jun. 14, 2005 has been disclaimed.

[21] Appl. No.: 142,954

[22] Filed: Jan. 12, 1988

[30] Foreign Application Priority Data

Jan. 14, 1987 [DE] Fed. Rep. of Germany ....... 3700821

[51] Int. Cl.$^4$ ........................ C08G 63/02; C08G 63/18
[52] U.S. Cl. .................................. 528/193; 528/194; 528/305
[58] Field of Search .......................... 528/193, 194, 305

[56] References Cited

U.S. PATENT DOCUMENTS

| 3,637,595 | 1/1972 | Cottis et al. | 528/193 |
| 4,327,205 | 4/1982 | Kato et al. | 528/128 |
| 4,412,058 | 10/1983 | Siemionko | 528/193 |
| 4,447,593 | 5/1984 | Funakoshi et al. | 528/194 |
| 4,503,005 | 3/1985 | Ueno et al. | 264/102 |
| 4,536,562 | 8/1985 | Deex | 528/193 |
| 4,563,508 | 1/1986 | Cottis et al. | 525/444 |
| 4,600,764 | 7/1986 | Dicke et al. | 528/194 |
| 4,713,435 | 12/1987 | Sugimoto et al. | 528/193 |
| 4,751,128 | 6/1988 | Portugall et al. | 528/176 |

FOREIGN PATENT DOCUMENTS

| 46225 | 3/1985 | Japan | 528/193 |
| 2061304 | 5/1981 | United Kingdom . | |

Primary Examiner—John Kight
Assistant Examiner—Dennis R. Daley
Attorney, Agent, or Firm—Oblon, Spivak, McClelland, Maier & Neustadt

[57] ABSTRACT

Wholly aromatic thermotropic polyesters are based on
(A) 30 to 60 mol % of 4-hydroxybenzoic acid,
(B) 20 to 35 mol % of terephthalic acid and
(C) 20 to 35 mol % of a mixture of
  ($C_1$) trimethylhydroquinone and
  ($C_2$) resorcinol the molar ratio of $C_1:C_2$ being within the range from 0.4:1 to 0.7:1 and the molar ratio of B:C within the range from 0.9:1 to 1.1:1.

4 Claims, No Drawings

WHOLLY AROMATIC THERMOTROPIC POLYESTERS

The present invention relates to a wholly aromatic thermotropic polyester based on
(A) from 30 to 60 mol % of 4-hydroxybenzoic acid,
(B) from 20 to 35 mol % of terephthalic acid and
(C) from 20 to 35 mol % of a mixture of
 ($C_1$) trimethylhydroquinone and
 ($C_2$) resorcinol,
the molar ratio of $C_1:C_2$ being within the range from 0.4:1 to 0.7:1 and the molar ratio of B:C within the range from 0.9:1 to 1.1:1.

The sum of components A+B+C is always 100 mol %.

The present invention further relates to a process for preparing such a polyester and to the use thereof for producing a fiber, film or molding.

The appellation "thermotropic" is applied in general to substances which form liquid-crystalline melts, i.e. melts having anisotropic properties.

The thermotropic aromatic polyesters from aromatic dicarboxylic acids and dihydroxy compounds, with or without aromatic hydroxycarboxylic acids, are known and described for example in Nos. GB-A-2,061,304, DE-A-2,025,971, EP-A-33,147 and EP-A-92,843. The disadvantage with these known systems is the fact that they need to be prepared in a complicated and time-consuming multistage process. What is more, the products generally have melting points above 350° C., which makes thermoplastic processing significantly more difficult.

DE-A-3,517,587 describes thermoplastic molding compositions which, in addition to an oxybenzoyl copolyester base resin, contain a minor amount of a polymeric flow modifier obtained from terephthalic acid, isophthalic acid, 4-hydroxybenzoic acid, hydroquinone and 4,4'-dihydroxydiphenyl. The 4,4'-dihydroxydiphenyl used is relatively costly, and the flow improvers described in the examples have in some instances melting points of more than 400° C., so that these products are very difficult to process thermoplastically.

It is an object of the present invention to provide a wholly aromatic thermotropic polyester which, compared with the flow modifiers described in said DE-A-3,517,587, is easier to process thermoplastically, cheaper to prepare, and has improved mechanical properties.

We have found that this object is achieved with the wholly aromatic thermotropic polyester defined at the beginning.

The wholly aromatic polyester according to the invention is composed of units derived from 4-hydroxybenzoic acid (A), terephthalic acid (B), trimethylhydroquinone ($C_1$) and resorcinol ($C_2$).

The proportion of 4-hydroxybenzoic acid (component A) is within the range from 30 to 60, in particular from 35 to 55, mol %.

The proportion of terephthalic acid (B) is within the range from 20 to 35, in particular from 22.5 to 32.5, mol %.

The same is true of the proportion of the mixture of dihydroxy compounds ($C_1$ and $C_2$).

The molar ratio of components B:C is in the range from 0.9:1 to 1.1:1, preferably from 0.95:1 to 1.05:1, and it is particularly advantageous to use substantially equimolar amounts of components B and C.

The molar ratio of trimethylhydroquinone ($C_1$): resorcinol ($C_2$) is within the range from 0.4:1 to 0.7:1, preferably from 0.45:1 to 0.65:1.

The thermotropic, i.e. liquid-crystalline, state of the wholly aromatic polyester according to the invention is demonstrable for example using a polarization microscope by a method described in German Laid-Open Application DOS No. 2,520,819. Applied in a thickness of about 10μm between glass plates, and viewed between crossed polarizers, the polymer melt has textures which are ascribable to a mesomorphic phase.

The relative viscosity of the wholly aromatic polyester according to the invention, determined in a 0.1% strength by weight solution in pentafluorophenol at 60° C., is preferably within the range from 1 to 4, in particular from 1.5 to 3.5, dl/g.

The wholly aromatic thermotropic polyester according to the invention has good mechanical properties, in particular a high modulus of elasticity, a high breaking strength and elongation at break, and a high impact strength.

The modulus of elasticity, measured in accordance with German Standard Specification DIN 53,457, is in general within the range from 8,000 to 20,000, in particular from 10,000 to 18,000, $N/mm^2$, the breaking strength within the range from 60 to 180, in particular from 80 to 150, $N/mm^2$ (measured in accordance with DIN 54,455), and the elongation at break within the range from 0.5% to 5%, preferably from 1% to 4%.

Typical impact strengths, measured in accordance with DIN 53,453 at 23° C., are within the range from 12 $kJ/m^2$ to 40 $kJ/m^2$, in particular from 15 to 30 $kJ/m^2$.

The glass transition point is in general within the range from 120 to 180° C., in particular from 130 to 170° C.

The thermotropic polyester according to the invention is basically preparable in a conventional manner, for example as described in U.S. Pat. Nos. 4,375,530 and 4,118,372.

It is advantageous to employ a process where the starting materials A, B, $C_1$ and $C_2$ are subjected to a single-stage polycondensation in the melt in the presence of a 5 to 60% molar excess, based on the total OH group content, of an anhydride of an alkanecarboxylic acid of 2 to 6 carbon atoms. In this definition of the molar excess of anhydride the total OH group content is that of the monomer mixture.

Of the anhydrides of alkanecarboxylic acids of 2 to 6 carbon atoms, preference is given to acetic anhydride, propionic anhydride and butyric anhydride, in particular acetic anhydride. The molar excess of anhydride is preferably from 10 to 50 mol %.

It has also proven to be advantageous to carry out the reaction in an inert gas atmosphere, for example under nitrogen or argon.

Sometimes it is advantageous to speed up the reaction by using a catalyst, for example a catalyst of the type described in EP-A-131,846. In this case, the proportion of this catalyst is in general from 0.001 to 1% by weight, based on the total amount of monomers used.

In what follows, a particularly preferred embodiment of this process is described.

The monomers A, B, $C_1$ and $C_2$ and the carboxylic anhydride are mixed in an inert gas atmosphere, and the temperature is raised to the refluxing point of the mixture with stirring. In raising the temperature, it is advantageous to do so in stages by first maintaining a temperature from 130 to 200° C. for up to 5 hours, preferably up to 2 hours, and then to raise the temperature to 250–370° C. preferably in the course of a period from 2 to 2.5 hours. In the course of the reaction, excess carboxylic anhydride and carboxylic acids formed are distilled off.

To obtain as high a conversion as possible, it is advantageous to perform the last phase of he reaction under reduced pressure, preferably within the range from 0.1 to 200 mbar (10 to 20,000 Pa).

The wholly aromatic polyester thus obtained can subsequently be subjected to a postcondensation in the solid phase. This is preferably carried out at from 200 to 300° C., preferably from 200 to 280° C. It is also possible to perform the postcondensation in the solid phase after thermoplastic processing.

Advantageously, the condensation in the solid phase is likewise carried out in an inert gas atmosphere, for example under nitrogen or argon.

The process described above produces in a single stage and in a relatively short time a wholly aromatic polyester having advantageous properties.

The wholly aromatic polyester according to the invention may be admixed with customary additives and processing aids. Examples are stabilizers to oxidation, heat and UV light, lubricants, mold release agents, dyes and pigments, fibrous or pulverulent fillers and reinforcing agents, nucleating agents and plasticizers. Additives of this type are known and described in the literature.

Examples of oxidation retardants and heat stabilizers are halides of metals of group I of the periodic table, alone or blended with copper(I) halides or sterically hindered phenols, in concentrations of up to 1% by weight.

Examples of UV stabilizers are substituted resorcinols, salicylates, benzotriazoles, benzophenones and mixtures thereof, which are generally added in amounts of up to 2% by weight.

Dyes and pigments are generally used in amounts of up to 5% by weight. Examples are nigrosine, titanium dioxide, cadmium sulfide, phthalocyanine dyes, ultramarine blue and carbon black.

Fillers and reinforcing agents are for example carbon fibers, glass fibers, amorphous silica, calcium silicate, aluminum silicate, magnesium carbonate, kaolin, chalk, quartz powder, mica and feldspar, which can account for up to 70% by weight of the total weight of the filled composition.

Examples of nucleating agents are talc, calcium fluoride, sodium phenylphosphinate, alumina and finely divided polytetrafluoroethylene.

It is also possible to use up to 20% by weight of plasticizers such as phthalic esters, hydrocarbon oils and sulfonamides.

The wholly aromatic polyester according to the invention has a smooth, shiny and substantially mar-resistant surface coupled with a light self-color. It is also substantially resistant to chemicals and flame-resistant, and for polyester it has excellent hydrolysis stability.

Moldings produced from the wholly aromatic polyester according to the invention have excellent mechanical properties, in particular stiffness, strength and toughness. The wholly aromatic polyester is therefore suitable in particular for producing moldings for electronics, dataprocessing, automotive construction and other industrial sectors.

In addition, the polyester according to the invention can be converted into fibers and films having an excellent range of properties.

The processing of the polyester according to the invention can in general be carried out at below 370° C. by injection molding, pressing or extruding. Processes of this type are known and described in the literature.

EXAMPLE 1

To prepare a polyester according to the invention the following components were used:
3.9 mol (39.4 mol %) of 4-hydroxybenzoic acid,
3 mol (30.3 mol %) of terephthalic acid,
1.05 mol (10.6 mol %) of trimethylhydroquinone and
1.95 mol (19.7 mol %) of resorcinol.

These components were introduced together with 1,260 g of acetic anhydride under nitrogen into a 5 l reaction vessel. While stirring, the external temperature was then raised to 150° C. in the course of 30 min and then to 350° C. in the course of 150 min. Thereafter the pressure was reduced to 600 mbar and successively halved every 10 minutes. All the while the external temperature was raised to 360° C.

The final pressure was 100 mbar.

The intrinsic viscosity of the polyester obtained was 3.3 dl/g, measured in a 0.1% strength by weight solution in pentafluorophenol at 60° C.

The polyester formed a fiber-forming mesomorphic melt.

DSC measurements indicated a glass transition point Tg at 146° C.

The polymer was satisfactorily processible by injection molding at 360° C.

Tests of the mechanical properties produced the following values:
Modulus of elasticity (in accordance with DIN 53,457) 12,072 N/mm$^2$
Breaking strength (in accordance with DIN 53,455) 105 N/mm$^2$
Elongation at break (in accordance with DIN 53,455) 1.99%
Impact strength (in accordance with DIN 53,453) at 23° C. 22.6 kJ/m$^2$.

We claim:
1. A wholly aromatic thermotropic polyester based on
(A) from 30 to 60 mol % of 4-hydroxybenzoic acid,
(B) from 20 to 35 mol % of terephthalic acid and
(C) from 20 to 35 mol % of a mixture of
  ($C_1$) trimethylhydroquinone and
  ($C_2$) resorcinol,
the molar ratio of $C_1:C_2$ being within the range from 0.4:1 to 0.7:1 and the molar ratio of B:C within the range from 0.9:1 to 1.1:1.

2. A wholly aromatic thermotropic polyester as claimed in claim 1, obtainable by single-stage polycondensation of components A, B, $C_1$ and $C_2$ in the melt in the presence of a 5 to 60% molar excess, based on the total OH group content, of an anhydride of an alkanecarboxylic acid of 2 to 6 carbon atoms.

3. A process for preparing a wholly aromatic thermotropic polyester based on
(A) from 30 to 60 mol % of 4-hydroxybenzoic acid,
(B) from 20 to 35 mol % of terephthalic acid and
(C) from 20 to 35 mol % of a mixture of
  ($C_1$) trimethlylhydroquinone and
  ($C_2$) resorcinol,
the molar ratio of $C_1: C_2$ being within the range from 0.4:1 to 0.7:1 and the molar ratio of B:C within the range from 0.9:1 to 1.1:1, by single-stage polycondensation in the melt in the presence of an anhydride of an alkanecarboxylic acid of 2 to 6 carbon atoms which comprises (a) reacting components A, B, $C_1$ and $C_2$ in the presence of a 5 to 60% molar excess, based on the total OH group content, of the anhydride of an alkanecarboxylic acid and, if desired, (b) subjecting the product obtained to a postcondensation in the solid phase.

4. A dimensionally stable molding containing as essential component a wholly aromatic thermotropic polyester as claimed in claim 1.

* * * * *